United States Patent [19]

Gresh

[11] Patent Number: 4,749,199
[45] Date of Patent: Jun. 7, 1988

[54] SEAL ASSEMBLY INCLUDING A SEALING RING HAVING INTERNAL LUBRICANT PASSAGEWAYS

[75] Inventor: Michael T. Gresh, Jeannette, Pa.

[73] Assignee: Elliott Turbomachinery Co., Inc., Jeannette, Pa.

[21] Appl. No.: 564,254

[22] Filed: Dec. 22, 1983

[51] Int. Cl.$^4$ .......................... F16J 15/34; F16J 15/40
[52] U.S. Cl. .......................... 277/83; 277/75; 277/22
[58] Field of Search .................. 277/96.1, 83, 22, 75, 277/76, 173

[56] References Cited

U.S. PATENT DOCUMENTS

| | | | |
|---|---|---|---|
| 1,618,655 | 2/1927 | Halvorsen | 277/83 |
| 3,804,424 | 4/1974 | Gardner | 277/96.1 |
| 3,921,986 | 11/1975 | Geary et al. | 277/83 |

OTHER PUBLICATIONS

Elliott Company Literature "Centrifugal Compressor Seals," 2 pp., date and publisher unknown.
Isocarbon Seal Assembly, pp. 10–12, date unknown, publisher unknown.

*Primary Examiner*—Robert S. Ward
*Attorney, Agent, or Firm*—Webb, Burden, Robinson & Webb

[57] ABSTRACT

A shaft seal assembly having an annular member affixed to the shaft for rotation therewith, a sleeve encompassing the shaft and being biased axially towards the annular member and a free floating sealing ring interposed between the annular member and the sleeve to prevent pressurized working substance form leaking about the shaft is disclosed. The sealing ring includes internal flow passageways which act to reduce the pressure of lubricant flowing therethrough to both effectively cool the free floating ring and to reduce the pressure of the lubricant obviating the necessity of a separate breakdown bushing.

9 Claims, 3 Drawing Sheets

SEAL ASSEMBLY INCLUDING A SEALING RING HAVING INTERNAL LUBRICANT PASSAGEWAYS

BACKGROUND OF THE INVENTION

This invention relates to sealing apparatus for use in rotary machinery for preventing a working substance under pressure from leaking about a shaft of the machine.

More specifically, this invention relates to an improvement on ISO-SEAL structure as conventionally utilized in relation to high speed rotating shafts. In this particular arrangement, an annular rotating element or collar is affixed to the shaft and coacts with a non-rotating sleeve through means of a free floating carbon ring, interposed therebetween, to prevent working fluids from leaking about the shaft into the surrounding areas of lower pressure. The sleeve of the sealing assembly is yieldably urged against the free floating carbon ring so as to bias the ring in face to face contact against the rotating member. In prior art devices the outside of the assembly is flooded with oil to provide the necessary cooling.

In practice, oil or other lubricant has been pumped under pressure to flood the free floating carbon ring. The oil is then directed in two directions along a shaft, one being towards the high pressure area such that oil contaminated with the working fluid is collected at the contaminated oil discharge and the other being away from the high pressure area to a separate clean oil collection area. In order to prevent high pressure oil from being discharged out of the seal a separate breakdown bushing and seal is provided on the shaft downstream from the rotating element to reduce oil flow along the shaft and to prevent oil that does travel along the shaft from being discharged at high pressure. A clean oil discharge area is provided to remove the oil from the seal assembly prior to passing through the breakdown bushing. The flow resistance created by the breakdown seal is sufficient to effect a pressure drop to atmospheric pressure in the oil flowing therethrough.

The present invention is an improvement on the above-described ISO-SEAL structure. The utilization of the breakdown bushing serves to increase the length of the seal since the breakdown bushing must be axially mounted downstream from the seal prior to the bearing supporting the shaft. If the breakdown bushing is removed the length of the shaft may be decreased. The removal of the breakdown bushing from the seal assembly further serves to reduce the number of components which may fail under operation. Hence, by the removal of this device the integrity and life of the entire seal may be improved.

The herein invention is directed at supplying lubricant directly to passageways in the free floating carbon ring. By directing the lubricant through the passageways the lubricant is decreased in pressure to essentially atmospheric pressure and thereafter flows downstream to a region of atmospheric pressure from which it is collected. The lubricant does not flow through a subsequent breakdown bushing. The reduction in pressure of the lubricant occurs in the passageways in the free floating ring or the contact seal sleeve obviating the necessity of maintaining a high pressure oil discharge area and a subsequent breakdown bushing. Additionally, by directing the oil directly through passageways in the sealing ring additional cooling of the sealing ring is provided allowing for performance at higher speeds and prolonging the life of the floating ring.

Additionally, disclosed is a combination which allows the high pressure working fluid to be supplied to both sides of the sealing ring to provide equalized forces for maintaining the carbon ring in the desired position. Also disclosed is the utilization of a carbon ring seal using both the interior and exterior surfaces of the carbon ring as tight fitting positioning surfaces eliminating the necessity of providing a metal band about the exterior of the carbon ring for supporting the ring further serving to secure the integrity of the entire seal arrangement.

SUMMARY OF THE INVENTION

It is an object of the present invention to improve shaft sealing apparatus.

Another object of the present invention is to reduce the overall length of the shaft seal by eliminating a breakdown bushing.

It is a further object of the present invention to utilize passageways in a free floating carbon ring to effect oil pressure reduction to eliminate subsequent oil pressure collection areas.

It is a still further object of the present invention to provide passageways in a carbon ring to effect improved cooling of the carbon ring.

It is a still further object of the present invention to provide apparatus for directing pressurized fluid to both sides of a carbon ring to maintain a pressure balance thereon.

It is a yet further object of the present invention to have a free floating carbon ring having sealing positioning portions on both the interior and exterior surfaces eliminating the necessity of a metal band about the exterior of the carbon ring.

A yet further object of the present invention is to provide a safe, economical, reliable and easy to manufacture seal capable of operating at high speeds.

Other objects will be apparent from the description to follow and the appended claims.

These and other objects of the present invention are obtained in a shaft seal assembly including an annular member affixed to a shaft for rotation therewith, a sleeve encompassing the shaft and being biased axially towards the annular member and a free floating sealing ring interposed between the annular member and the sleeve to prevent a pressurized working substance from leaking about the shaft. Means for supplying lubricant under pressure to the sealing ring including a cavity through the sleeve and passageway means formed in the sealing ring to receive lubricant from the means for supplying lubricant and to direct said lubricant through the sealing ring are provided to effect a reduction in pressure of the lubricant and to transfer heat energy from the sealing ring to the lubricant.

The seal assembly may further include an annular spring cavity assembly mounted radially outwardly from the sealing ring and further comprising said annular ring cavity assembly defining a sealing ring contact surface and said sealing ring extending radially outward from the rotating shaft or rotating sleeve affixed thereto to the sealing ring contact surface to form a locating surface on the radially interior portion and a positioning surface on the radially exterior surface of the sealing ring.

DESCRIPTION OF THE PREFERRED EMBODIMENT

Figure 1:
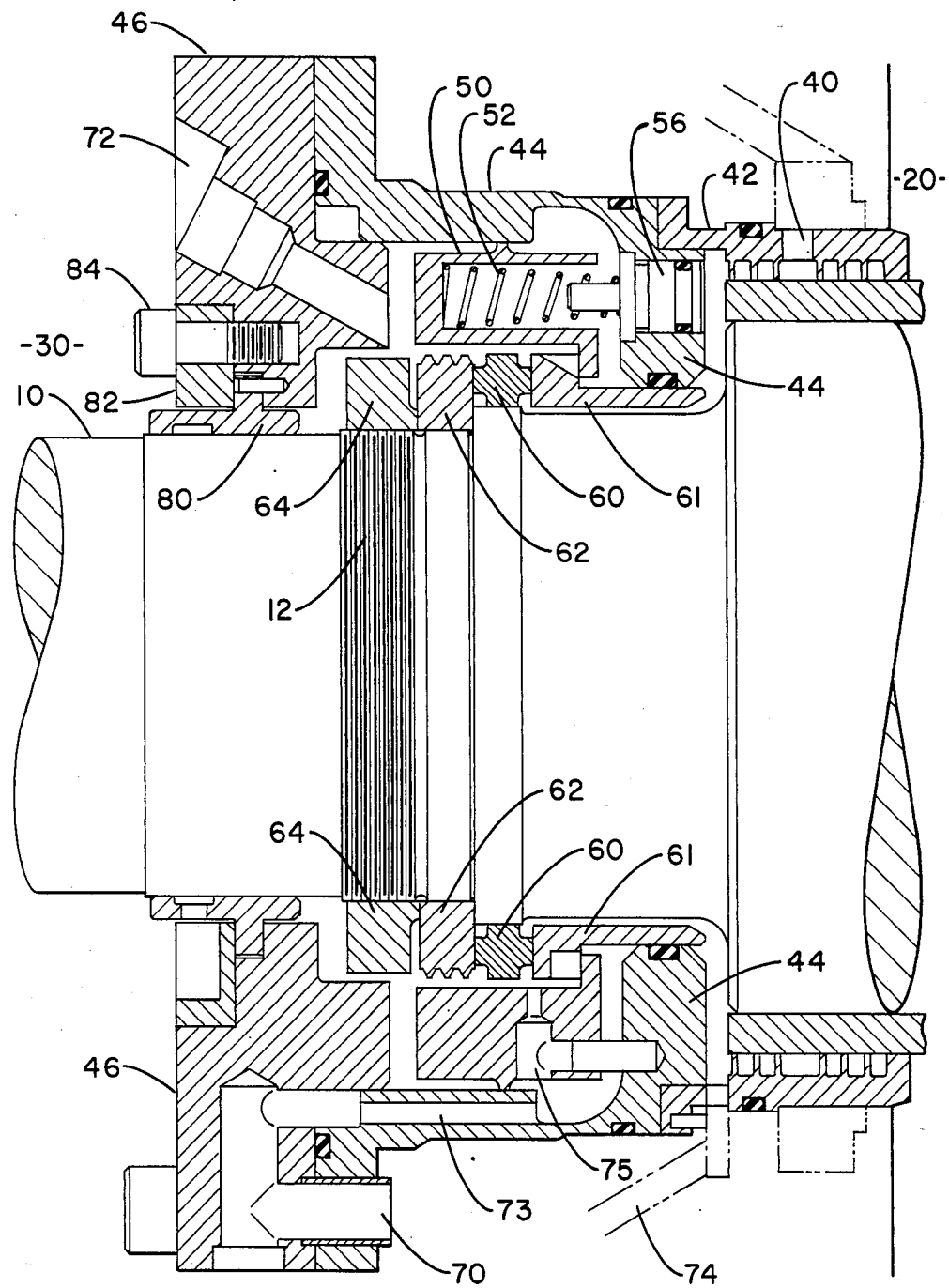
FIG. 1 is a cross-sectional view of a prior art sealing assembly.

Both a prior art sealing assembly and two embodiments of the present invention will be described herein. Wherever possible common reference numerals have been used therebetween.

Referring now to the prior art drawing in FIG. 1, it may be seen that a shaft 10 has a seal assembly encompassing same. As seen in FIG. 1, high pressure area 20 is to the right or upstream and is the direction from which the high pressure working fluid may flow. Low pressure area 30 may be at atmospheric pressure and is located downstream from the sealing assembly and is an area at atmospheric pressure such that there is a change in pressure between high pressure area 20 and low pressure area 30. Typically, the bearing for supporting the shaft is located within low pressure area 30 and is physically on shaft 10 to the left of the seal assembly shown in FIG. 1.

The seal assembly includes a labrynth seal 42 which may be supplied with a buffer gas 40 as is known in the art for maintaining the high pressure substance or gas primarily to the right of the seal.

Shaft threads 12 are shown extending circumferentially about the shaft and lock nut 64 is shown engaging the shaft at threads 12. Located immediately upstream from lock nut 64 is rotating contact ring 62 which rotates with the shaft. Located immediately upstream from rotating contact ring 62 is carbon ring 60 (also referred to as a sealing ring) contacting both the shaft and rotating contact ring 62 and contact seal sleeve 61 located upstream from carbon ring 60. Contact seal sleeve 61 extends upstream from carbon ring 60 and forms a seal with inboard seal housing 44, labyrinth seal 42 and the shutdown piston 56 to direct the high pressure fluid only to the bottom portion of carbon ring 60.

Inboard seal housing 44 is shown extending from the exterior of the housing to a portion in contact with contact seal sleeve 64. Inboard seal housing 44 is additionally in contact with spring retainer 50 which is another cylindrical element in which springs 52 are contained. Shutdown piston 56 coacts with spring 52 to allow for shutdown action. During operation oil under pressure is supplied through oil feed 70 through conduit 75 to force the shutdown piston 56 to the right allowing the spring force of springs 52 to axially force contact seal sleeve 61 against carbon ring 60 and the rotating contact ring 62 to provide the appropriate sealing arrangement. Upon shutdown of the lubrication system high pressure being supplied against shutdown piston 56 and contacting spring retainer 50 will move the piston to the left compressing springs 52 such that additional force is exerted by contact seal sleeve 61 against the carbon ring during shutdown periods to provide a seal to maintain the high pressure area. By allowing the shutdown piston 56 to be urged to the right during operation, the seal is maintained while providing for reduced frictional forces.

The lubricant is supplied through oil feed 70 and cavity 73 via conduit 75 to the contact seal sleeve and to carbon ring 60. A portion of the lubricant flows towards the low pressure area 30 where it is removed through clean oil discharge 72. Breakdown bushing 80, is supported by breakdown bushing retainer 82 and bolt 84 which act to secure the breakdown bushing in position. The breakdown bushing is secured relative to the shaft to prevent oil from being discharged under pressure along the shaft. Although some oil is discharged along the shaft, the pressure of this oil is reduced by the breakdown bushing such that it is discharged at atmospheric pressure and does not spray therefrom. Additionally, some oil moves from left to right from the supply and is contaminated with the high pressure gas. This contaminated oil is removed through contaminated oil discharge 74.

Figure 2:
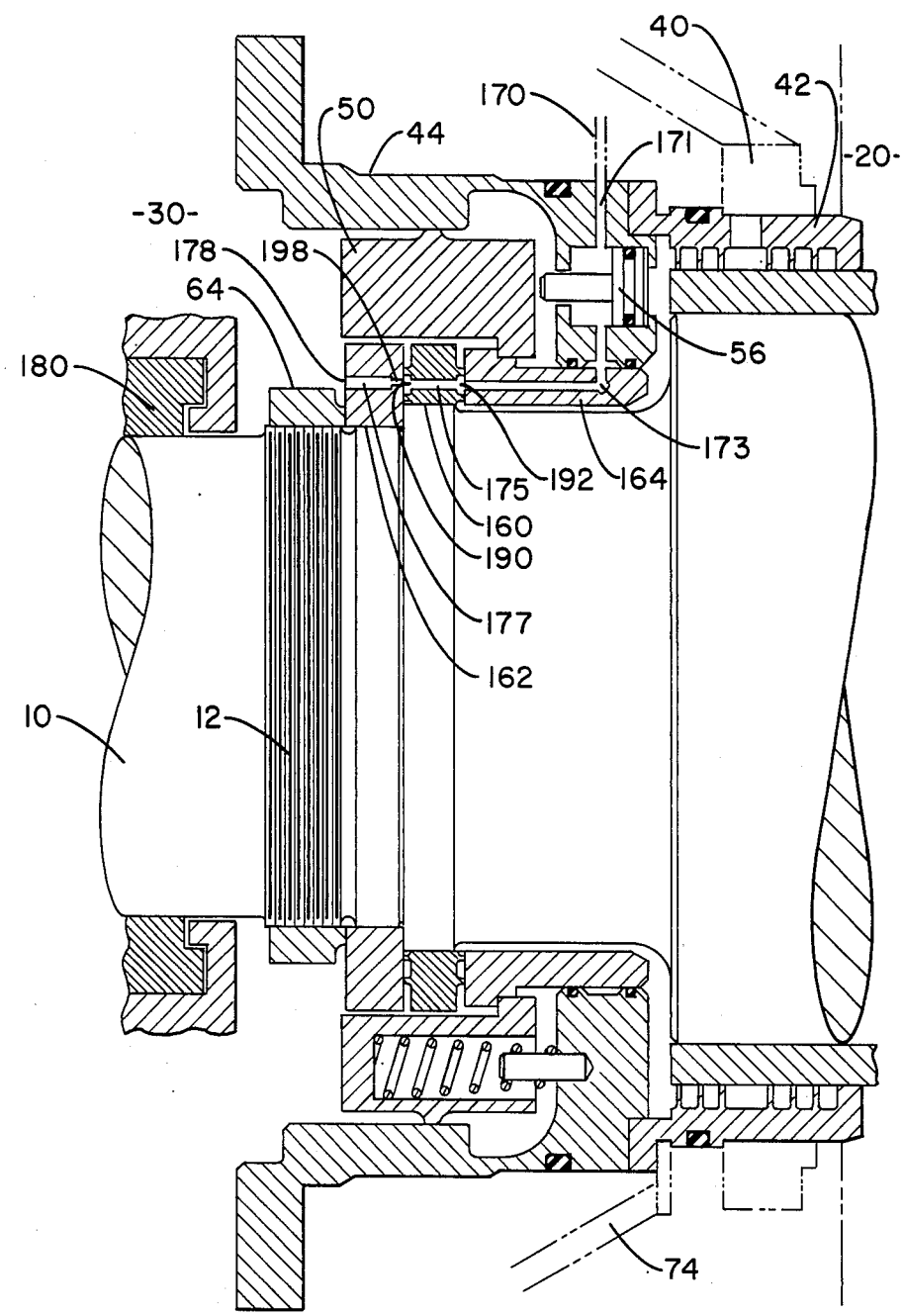
FIG. 2 is a cross-sectional view of one embodiment of the present invention.

Referring now to FIG. 2 there may be seen an improved version of this seal. In FIG. 2 it may be seen that labyrinth seal 42 and the buffer gas supply 40 thereto are in the same position. Additionally, inboard seal housing 44, spring retainer 50 and shutdown piston 56 are shown in the same position. However, oil is now supplied via oil inlet 170 through cavity 171 through the cavity of the shutdown piston 56 to conduit 173 within contact seal sleeve 164. Additionally, it may be seen that carbon ring 160 has passageway 175 extending therethrough and includes inlet 192 and outlet 190 for the lubricant flowing therethrough. Carbon ring 160 has additionally been extended such that its radially outward surface is positioned adjacent an interior surface of spring retainer 50 such that both the radially inward and outward surfaces of the carbon ring are positioned adjacent another surface obviating the necessity of providing a metal band about the ring to secure it for operation. Rotating contact ring 162 is now shown having oil discharge cavity 178 extending therethrough. Oil discharge cavity 178 includes orifice 198 which acts to effect the desired pressure reduction in the lubricant. Lock nut 64 secures the rotating contact ring in the same manner as the prior art device. The carbon ring and the contact seal sleeve are additionally maintained in similar positions.

As can be seen in FIG. 2, the oil enters through oil inlet 170 and flows through cavity 171, through shutdown piston 56 and then into conduit 173 in contact sleeve 164. From there the lubricant enters passageway 175 through carbon ring 160 through inlet line 192 and then flows to outlet 190 and through oil discharge cavity 178 including orifice 198 to low pressure area 30. Passageway 175 and orifice 198 are sized such that the pressure of the lubricant flowing therethrough is reduced from the feed pressure at oil inlet 170 to atmospheric pressure. Hence, carbon ring 160 and contact ring 162 serve to reduce the pressure obviating the necessity of a separate breakdown bushing or seal. Additionally, by having the lubricant flow directly through the carbon ring additional heat energy is removed from the carbon ring such that it runs at a cooler temperature. By running at the cooler temperature it has increased life and is not as subject to wear and breakdown.

Bearing 180 has additionally been added to FIG. 2 to show the location of the bearing relative to the lock nut 64. In comparing FIG. 2 to FIG. 1 it can be seen that the overall length of the seal has been vastly reduced since the bearing or journal supporting the shaft is now located in approximately the same position as the breakdown bushing previously. Hence, the shaft's length may be reduced effecting both a cost reduction and a weight reduction in the shaft. Additionally, by allowing the bearing to be more closely positioned to the load the stresses applied thereto may be also reduced.

Figure 3:
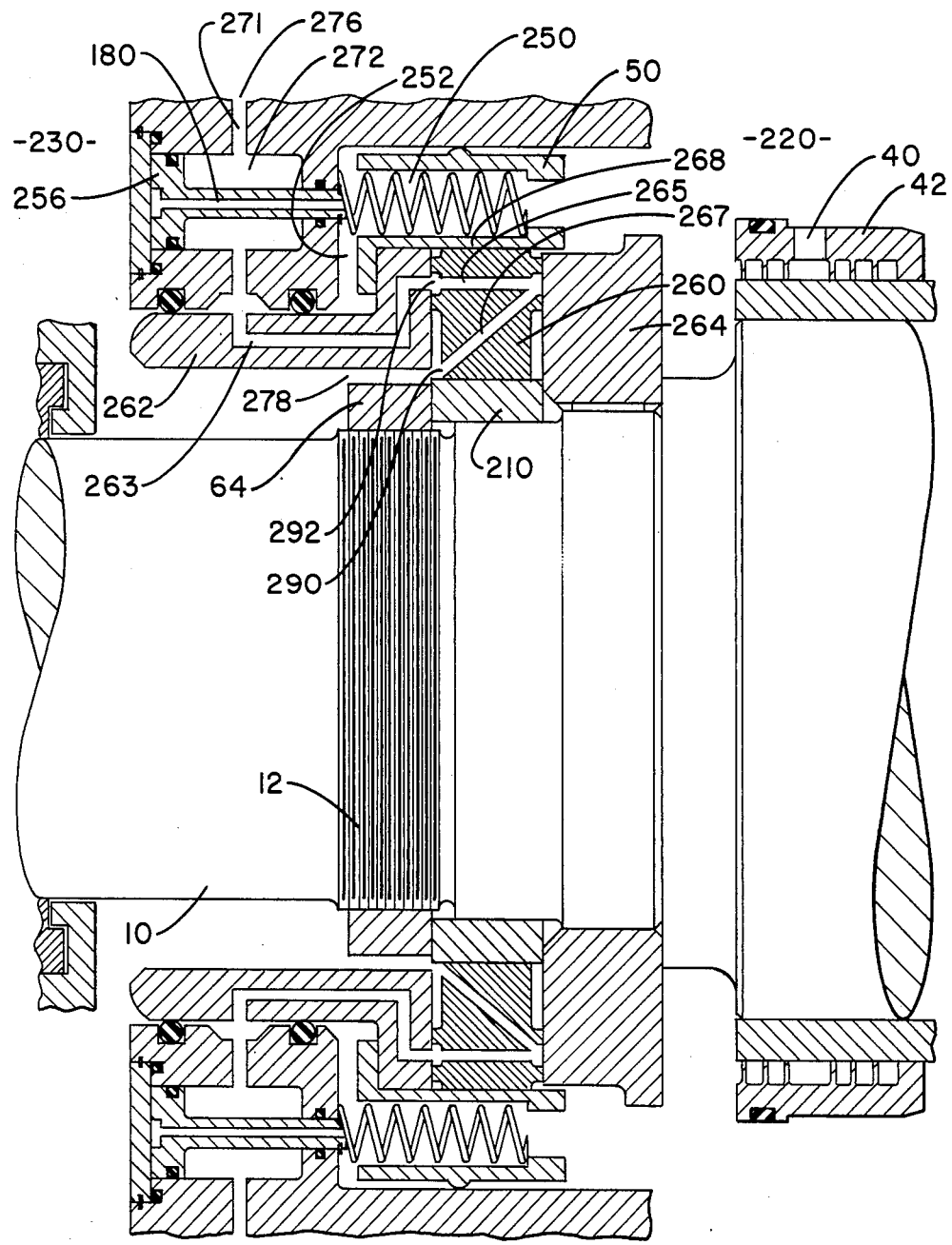
FIG. 3 is a cross-sectional view of another embodiment of the present sealing system.

FIG. 3 shows another embodiment of the present invention. In FIG. 3, the labyrinth seal is maintained in the same position. Lock nut 64 is secured to threads 12 of the shaft and has abutting thereto a rotating sleeve 210. Secured relative to the rotating sleeve 210 is rotating contact ring 264.

Stationary contact ring or contact seal sleeve 262 is shown mounted to the left of sealing ring or carbon ring 260 and is urged by spring means to the right securing the carbon ring between the stationary contact seal sleeve 262 and the rotating contact ring 264.

Inboard seal housing 244 is shown defining piston cavity 272 into which shutdown piston 256 is mounted and is shown mounted in sealing arrangement with stationary contact ring 262. Shutdown piston 256 includes a central cavity 280 for allowing high pressure gas to urge the piston to the right as shown in FIG. 3. Spring retainer 50 is shown defining a spring cavity 250 and coacting with shutdown piston 256 to provide an appropriate enhanced application of force between the stationary seal sleeve and the rotating contact ring upon shutdown of the lubricant system to maintain the high pressure substance sealed in the high pressure region.

Oil inlet 270 is shown through the inboard seal housing 244 such that oil flows through cavity 271 into the piston cavity 272. From there the oil flows through cavity 263 in the stationary contact ring and is discharged into passageway 265 of the carbon ring. Oil flows across the carbon ring in passageway 265 and then makes a sharp angle turn and flows downwardly through passageway 267 to outlet 290 from the carbon ring. Oil then flows through oil discharge passageway 278 to a region at atmospheric pressure. The passageways within the carbon ring are sized to obtain the desired drop in oil pressure. The passageways may include a pressure reducing orifice.

High pressure gas from region 220 is supplied to the top right hand corner of the sealing ring directly and is supplied through the spring cavity 250 and an opening in the spring retainer 50 to the left hand side of sealing ring 260. Hence, high pressure gas is supplied to both sides of the sealing ring to equalize the applied forces.

As in FIG. 2, the flow passageway through the carbon ring acts to effect a pressure reduction in the lubricant flowing therethrough obviating the necessity of a separate breakdown ring. Additionally, by the combined flow passageways enhanced cooling of the carbon ring is obtained.

It may be additionally seen that contact face 268 of spring retainer 50 is engaged with the top contact surface of carbon ring 260. Hence, it may be seen that all four surfaces of carbon ring 260 are secured against either the spring retainer, the rotating sleeve, the rotating contact ring or the stationary contact ring. Hence, the carbon ring is secured in both directions to help prevent the flow of high pressure substance to the low pressure region. Additionally, by contacting the carbon seal in all dimensions, the necessity of an additional metal band for maintaining the structural integrity of the carbon seal is not required.

The invention has been described herein with reference made to particular embodiments. It is to be understood by those skilled in the art that variations and modifications can be effected within the spirit and scope of the invention.

What is claimed is:

1. A shaft seal assembly including an annular member affixed to a shaft for rotation therewith, a sleeve encompassing the shaft and being biased axially towards the annular member and a free floating sealing ring interposed between the annular member and the sleeve to prevent a pressurized working substance from leaking about the shaft which comprises:
    means for supplying lubricant under pressure to the sealing ring including a cavity through the sleeve;
    passageway means formed in the sealing ring to receive lubricant from the means for supplying lubricant and to direct said lubricant through the sealing ring effecting a reduction in pressure of the lubricant and the transfer of heat energy from the sealing ring to the lubricant; and
    means for collecting lubricant discharged from the sealing ring at a reduced pressure.

2. The apparatus as set forth in claim 1 wherein the passageway means further includes a discharge outlet for discharging lubricant from the sealing ring wherein said annular member additionally defines a passageway aligned with the sealing ring passageway and wherein said passageway is sized to effect a further pressure reduction in the lubricant flowing therethrough.

3. The apparatus as set forth in claim 1 wherein the seal assembly further comprises an annular spring cavity assembly mounted radially outwardly from the sealing ring and further comprising:
    said spring cavity defining a sealing ring contact surface and said sealing ring extending radially outwardly from the rotating shaft or a rotating sleeve affixed thereto to the sealing ring contact surface to form a positioning surface at the radially exterior surface of the sealing ring.

4. The apparatus as set forth in claim 3 wherein the spring cavity assembly, the annular member and the sleeve are all positioned to allow the pressurized working substance to contact opposite sides of the sealing ring to balance the forces acting on the sealing ring.

5. The apparatus as set forth in claim 1 wherein the assembly includes a lock nut for securing the seal assembly in position on the shaft and further comprising a bearing means for supporting the shaft located about the shaft immediately adjacent the lock nut whereby the necessity of a breakdown bushing therebetween has been eliminated.

6. Apparatus serving as both a seal assembly affixed to a rotating shaft for containing a pressurized working substance and a break down seal for reducing lubricant pressure which comprises:
    an annular member fixed to the shaft for rotation therewith;
    a sleeve encompassing the shaft and being biased toward the annular member;
    a free floating sealing ring interposed between the annular member and the sleeve for preventing flow of the pressurized substance along the shaft;
    lubrication means for supplying lubricant under pressure to the sealing ring;
    said ring defining flow passageways for receiving and discharging lubricant, said passageways serving to reduce the pressure of the lubricant obviating the necessity of a subsequent breakdown seal; and
    means for collecting the lubricant discharged at a reduced pressure from the sealing ring.

7. The apparatus as set forth in claim 6 and further comprising said sleeve defining a lubricant directing passageway for conducting lubricant to the sealing ring.

8. The apparatus as set forth in claim 6 wherein the passageways in the sealing ring are positioned to promote heat transfer from the sealing ring to the lubricant flowing therethrough.

9. The apparatus as set forth in claim 6 wherein the annular member defines a flow passageway for lubricant, said passageway being alinged to receive lubricant from the passageway in the sealing ring and said passageway further serving to reduce the pressure of the lubricant flowing therethrough.

* * * * *